(12) United States Patent
Eberbach

(10) Patent No.: US 9,792,011 B2
(45) Date of Patent: Oct. 17, 2017

(54) RECONFIGURABLE COMPUTING DEVICE USER INTERFACE

(71) Applicant: International Business Machines Corporation, Armonk, NY (US)

(72) Inventor: Adam H. E. Eberbach, Surrey Hills (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/977,934

(22) Filed: Dec. 22, 2015

(65) Prior Publication Data

US 2017/0177184 A1    Jun. 22, 2017

(51) Int. Cl.
| G06F 13/38 | (2006.01) |
|---|---|
| G06F 13/12 | (2006.01) |
| G06F 3/0484 | (2013.01) |
| H04B 1/04 | (2006.01) |
| G06F 9/445 | (2006.01) |

(52) U.S. Cl.
CPC ........ G06F 3/0484 (2013.01); G06F 9/44505 (2013.01); H04B 1/04 (2013.01)

(58) Field of Classification Search
None
See application file for complete search history.

(56) References Cited

U.S. PATENT DOCUMENTS

| 9,417,754 | B2* | 8/2016 | Smith | G06F 3/048 |
|---|---|---|---|---|
| 2007/0021945 | A1* | 1/2007 | Riskey | A01K 11/008 |
| | | | | 702/188 |
| 2007/0118876 | A1* | 5/2007 | Singh | G06F 21/36 |
| | | | | 726/2 |
| 2007/0152058 | A1* | 7/2007 | Yeakley | G06F 17/2247 |
| | | | | 235/462.01 |
| 2011/0202839 | A1* | 8/2011 | AlKazi | G06F 3/0233 |
| | | | | 715/703 |
| 2014/0327636 | A1* | 11/2014 | Day | G06F 3/0416 |
| | | | | 345/173 |
| 2015/0174476 | A1 | 6/2015 | Morichau-Beauchant et al. | |
| 2015/0174479 | A1* | 6/2015 | Reiche | A63F 13/12 |
| | | | | 463/31 |

\* cited by examiner

*Primary Examiner* — Michael Sun
(74) *Attorney, Agent, or Firm* — Cantor Colburn LLP; Louis Percello

(57) ABSTRACT

Embodiments are directed to a computing device accessory system including a memory having user interface (UI) reconfiguration information, wherein the UI reconfiguration information is selected and loaded into the memory based at least in part on a perceptual attribute of the computing device accessory. The computing device accessory system further includes a transmitter and a processor system communicatively coupled to the memory and the transmitter. The processor system and the transmitter are configured to access the memory and transmit the UI reconfiguration information to a computing device having a reconfigurable UI. The computing device is configured to utilize the UI reconfiguration information to reconfigure the reconfigurable UI.

20 Claims, 4 Drawing Sheets

RECONFIGURABLE COMPUTING DEVICE USER INTERFACE

BACKGROUND

The present disclosure relates in general to reconfiguring a user interface (UI) of a computing device. More specifically, the present disclosure relates to systems and methodologies for automatically reconfiguring a computing device UI to match perceptual features of an accessory of the computing device.

Devices such as computers, phones, tablets and watches (i.e., computing devices) include a UI, which include various subsystems of the computing device through which a user interfaces with the computing device. Typical UIs include screens, graphical user interface (GUI) circuits, keyboards, cameras, microphones, speakers, point-and-click devices, joysticks, etc. The appearance and functionality of a UI can also take into account the user experience (UX) when interacting with the computing device. UX involves a person's behaviors, attitudes, and emotions about using a particular product, system or service. UX includes the practical, experiential, meaningful and valuable aspects of human-computer interaction and product ownership. Additionally, UX includes a person's perceptions of system aspects such as utility, ease of use and efficiency.

Computing devices may be accessorized with multiple covers, straps, pendants and other items. When buying an accessory a wide range of perceptual features such as designs and colors may be available. There is currently no system that automatically matches the perceptual features of the accessory to the perceptual features of the UI/UX of the computing device.

SUMMARY

Embodiments are directed to a method of forming a computing device accessory. The method includes providing the computing device accessory with a memory, a transmitter and a processor system communicatively coupled to the memory and the transmitter. The method further includes storing user interface (UI) reconfiguration information in the memory, wherein the UI reconfiguration information is selected for storage based at least in part on a perceptual attribute of the computing device accessory. The method further includes configuring the processor system and the transmitter to access the memory and transmit the UI reconfiguration information to a computing device comprising a reconfigurable UI, wherein the computing device is configured to utilize the UI reconfiguration information to reconfigure the reconfigurable UI.

Embodiments are further directed to a computing device accessory system including a memory having UI reconfiguration information, wherein the UI reconfiguration information is selected and loaded into the memory based at least in part on a perceptual attribute of the computing device accessory. The computing device accessory system further includes a transmitter and a processor system communicatively coupled to the memory and the transmitter. The processor system and the transmitter are configured to access the memory and transmit the UI reconfiguration information to a computing device having a reconfigurable UI. The computing device is configured to utilize the UI reconfiguration information to reconfigure the reconfigurable UI.

Embodiments are further directed to a computer program product for reconfiguring a computing device. The computer program product includes a computer readable storage medium having program instructions embodied therewith, wherein the computer readable storage medium is not a transitory signal per se. The program instructions are readable by at least one processor system to cause the at least one processor system to perform a method. The method includes accessing a memory of a computing device accessory, wherein the memory includes UI reconfiguration information, and wherein the UI reconfiguration information is selected and loaded into the memory based at least in part on a perceptual attribute of the computing device accessory. The method further includes transmitting, using a transmitter of the computing device accessory, the UI reconfiguration information to a computing device, wherein the computing device comprises a reconfigurable UI, and wherein the computing device is configured to utilize the UI reconfiguration information to reconfigure the reconfigurable UI.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
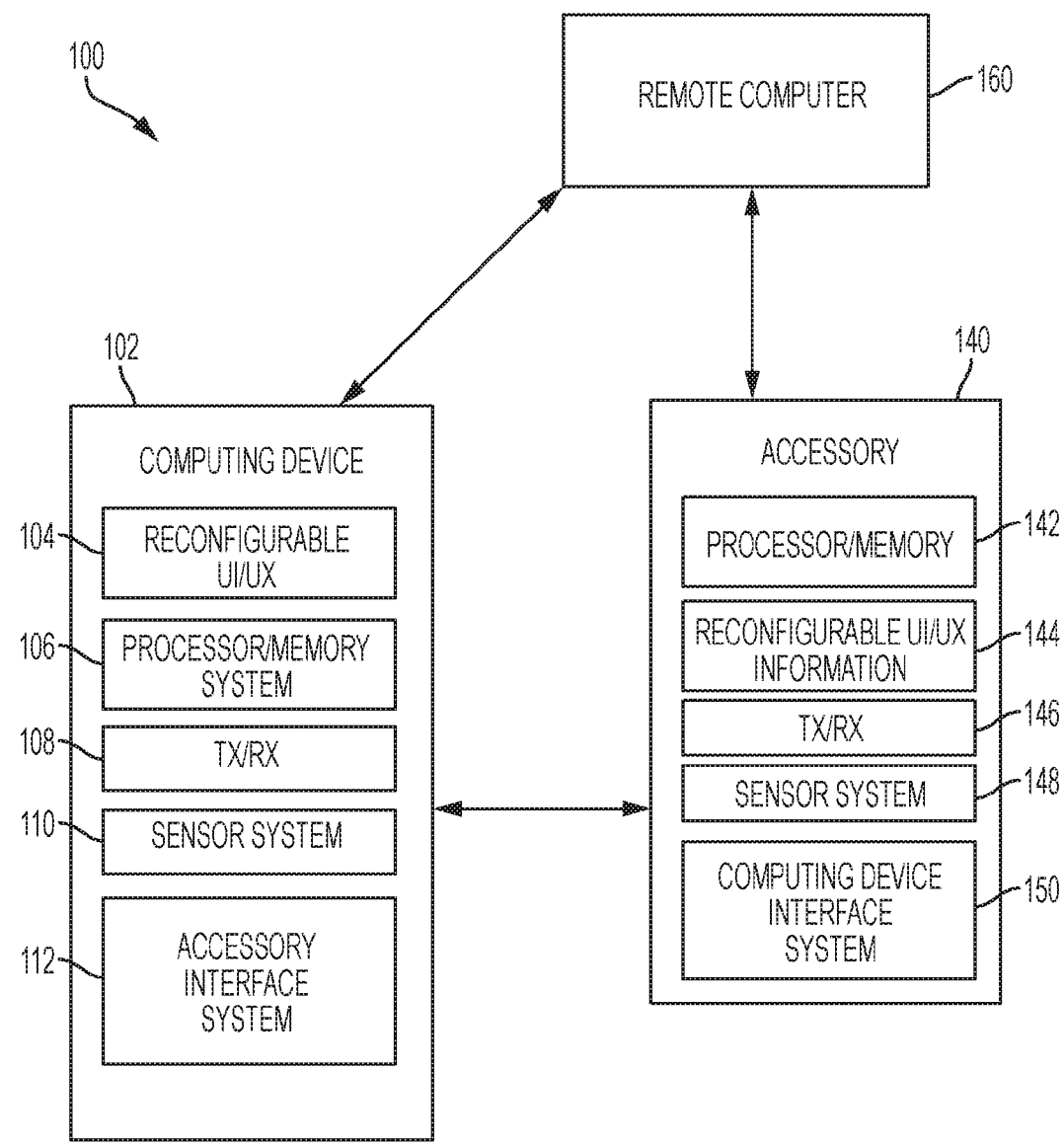
FIG. 1 depicts a diagram illustrating a system according to one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, it is understood in advance that although this disclosure includes a detailed description of processing UI/UX reconfiguration information, implementation of the teachings recited herein are not limited to particular UI/UX configurations. Rather, embodiments of the present disclosure are capable of being implemented in conjunction with any other type of UI/UX configuration and/or computing environment now known or later developed.

Turning now to an overview of the present disclosure, computing devices may be accessorized with multiple covers, straps, pendants and other items having a wide range of designs and colors. One or more embodiments of the present disclosure provide computing devices and accessories, wherein the accessory is provided with sufficient processor, memory and transmission functionality to store UI/UX reconfiguration information and download the UI/UX reconfiguration information to the computing device to reconfigure the UI/UX of the computing device to match the accessory. As an example, a themed cover may be attached to a tablet computer, wherein the cover includes a processor/memory that stores UI/UX reconfiguration information that is downloaded from the accessory to the computing device to re-skin the UI/UX of the computing device to match the theme of the cover. If, for example, the cover is pony-themed, the UI/UX of the computing device could be reconfigured to display rainbows that match the pony-theme, and sounds of the UI/UX of the computing device could be reconfigured to use pony-themed sounds.

Turning now to a detailed description of the present disclosure, FIG. 1 depicts a diagram illustrating a system 100 according to one or more embodiments. System 100 includes a computing device 102, an accessory 140 and an optional remove computer 160, configured and arranged as shown. Computing device 102 includes a reconfigurable UI/UX 104, a processor/memory system 106, a transmitter (TX) and receiver (RX) system 108, a sensor system 110 and an accessory interface system 112, configured and arranged as shown. Accessory 140 includes a processor/memory system 142, reconfigurable UI/UX information 144, a TX/RX system 146, a sensor system 148 and a computing device interface system 150, configured and arranged as shown.

Computing device 102 may take a variety of forms, including but not limited to computers, phones, tablets and watches. Reconfigurable UI/UX 104 may take a variety of forms, including but not limited to screens, GUI circuits, keyboards, cameras, microphones, speakers, point-and-click devices, joysticks, etc. Reconfigurable UI/UX 104 also takes into account the user experience (i.e., UX) when interacting with computing device 102. UX involves a person's behaviors, attitudes, and emotions about using a particular product, system or service. UX includes the practical, experiential, meaningful and valuable aspects of human-computer interaction and product ownership. Additionally, UX includes a person's perceptions of system aspects such as utility, ease of use and efficiency. UX is impacted by the amount of information that a user is required to enter into a system in order to have that system perform a particular task. Processor/memory 108 may be implemented according to computer system 200 shown in FIG. 2, which is described in greater detail later in this disclosure. TX/RX system 108 may be any form of wireless or wired communication system. Sensor system 110 may be any form of wireless or wired detection system capable of detecting a predetermined proximity of computing device 102 to accessory 140. Accessory interface system 112 provides a physical contact interface between computing device 102 and accessory 140 for communication and/or detection.

Accessory 140 may take a variety of forms, including but not limited to covers, straps, pendants and other items. Processor/memory 142 may be implemented according to computer system 200 shown in FIG. 2, which is described in greater detail later in this disclosure. Reconfigurable UI/UX information 144 may take a variety of forms, including but not limited to computer instructions and/or control signals capable of reconfiguring screens, GUI circuits, keyboards, cameras, microphones, speakers, point-and-click devices, joysticks, and the like of reconfigurable UI/UX 104 of computing device 102. Reconfigurable UI/UX information 144 can also takes into account and reconfigure the UX of computing device 102. TX/RX system 146 may be any form of wireless or wired communication system. Sensor system 148 may be any form of wireless or wired detection system capable of detecting a predetermined proximity of accessory 140 to computing device 102. Computing device interface system 150 provides a physical contact interface between accessory 140 and computing device 102 for communication and/or detection.

Figure 2:
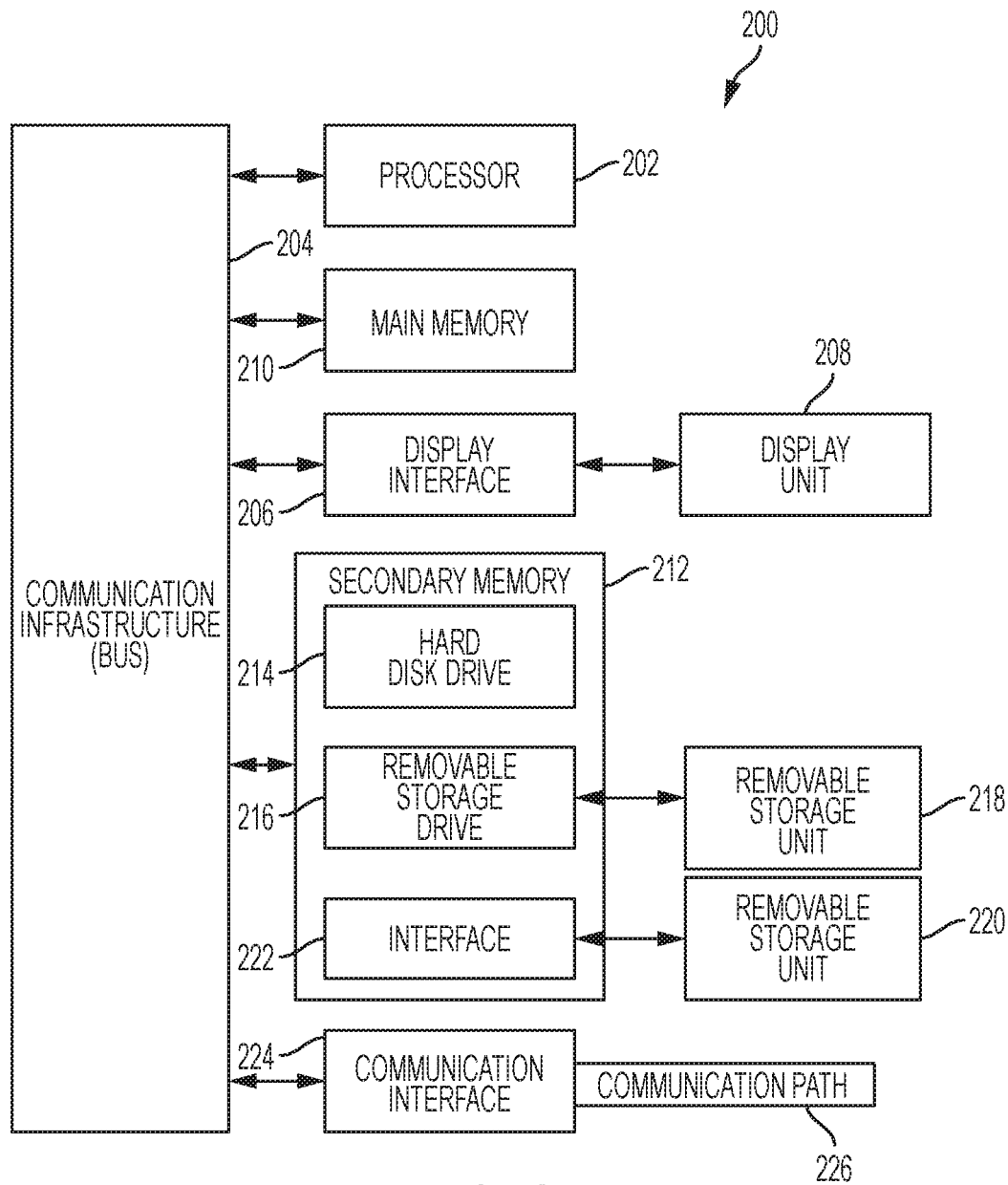
FIG. 2 depicts an exemplary computer system capable of implementing components of the system shown in FIG. 1.

FIG. 2 illustrates a high level block diagram showing an example of computer system 200 for implementing one or more embodiments of processor/memory systems 106, 142 shown in FIG. 1. Although one exemplary computer system 200 is shown, computer system 200 includes a communication path 226, which connects computer system 200 to additional systems (e.g., remote computer 160 shown in FIG. 1) and may include one or more wide area networks (WANs) and/or local area networks (LANs) such as the Internet, intranet(s), and/or wireless communication network(s). Computer system 200 and additional system are in communication via communication path 226, e.g., to communicate data between them.

Computer system 200 includes one or more processors, such as processor 202. Processor 202 is connected to a communication infrastructure 204 (e.g., a communications bus, cross-over bar, or network). Computer system 200 can include a display interface 206 that forwards graphics, text, and other data from communication infrastructure 204 (or from a frame buffer not shown) for display on a display unit 208 (or UI/UX 104). Computer system 200 also includes a main memory 210, preferably random access memory (RAM), and may also include a secondary memory 212. Secondary memory 212 may include, for example, a hard disk drive 214 and/or a removable storage drive 216, representing, for example, a floppy disk drive, a magnetic tape drive, or an optical disk drive. Removable storage drive 216 reads from and/or writes to a removable storage unit 218 in a manner well known to those having ordinary skill in the art. Removable storage unit 218 represents, for example, a floppy disk, a compact disc, a magnetic tape, or an optical disk, etc. which is read by and written to by removable storage drive 216. As will be appreciated, removable storage unit 218 includes a computer readable medium having stored therein computer software and/or data.

In alternative embodiments, secondary memory 212 may include other similar means for allowing computer programs or other instructions to be loaded into the computer system. Such means may include, for example, a removable storage unit 220 and an interface 222. Examples of such means may include a program package and package interface (such as that found in video game devices), a removable memory chip (such as an EPROM, or PROM) and associated socket, and other removable storage units 220 and interfaces 222 which allow software and data to be transferred from the removable storage unit 220 to computer system 200.

Computer system 200 may also include a communications interface 224. Communications interface 224 allows software and data to be transferred between the computer system and external devices. Examples of communications interface 224 may include a modem, a network interface (such as an Ethernet card), a communications port, or a PCM-CIA slot and card, etcetera. Software and data transferred via communications interface 224 are in the form of signals which may be, for example, electronic, electromagnetic, optical, or other signals capable of being received by communications interface 224. These signals are provided to communications interface 224 via communication path (i.e., channel) 226. Communication path 226 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 210 and secondary memory 212, removable storage drive 216, and a hard disk installed in hard disk drive 214. Computer programs (also called computer control logic) are stored in main memory 210 and/or secondary memory 212. Computer programs may also be received via communications interface 224. Such computer programs, when run, enable the computer system to perform the features of the present disclosure as discussed herein. In particular, the computer programs, when run, enable processor 202 to perform the features of the computer system. Accordingly, such computer programs represent controllers of the computer system.

Figure 3:
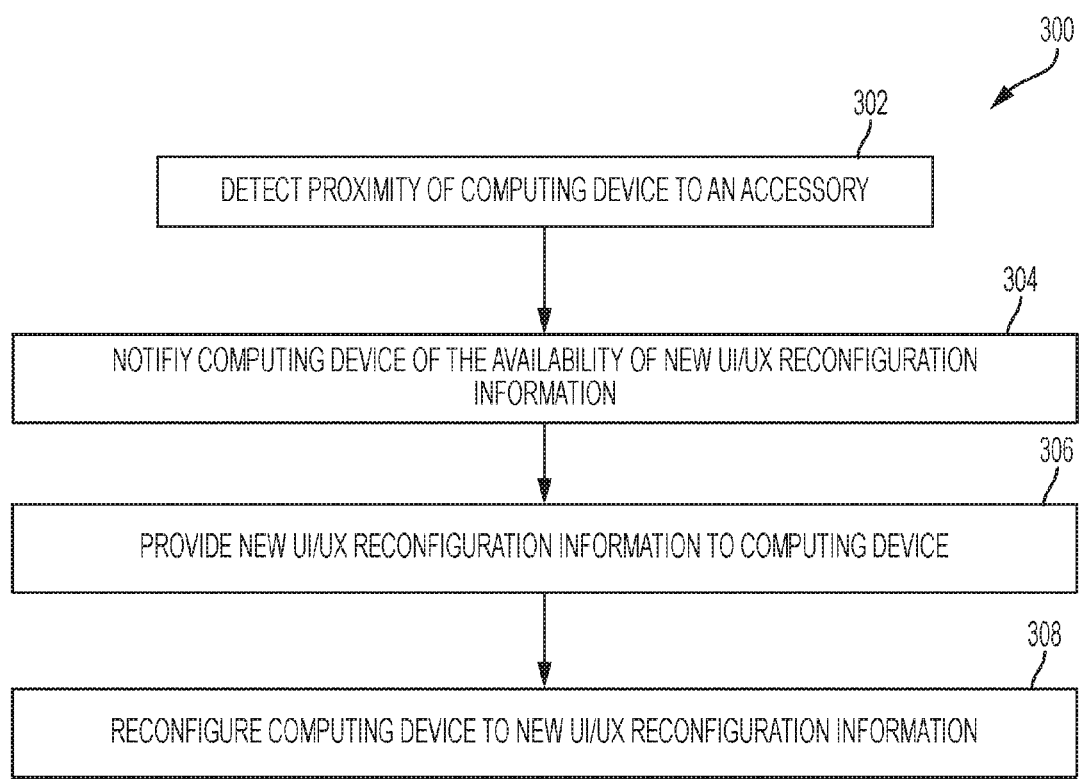
FIG. 3 depicts a flow diagram illustrating a methodology according to one or more embodiments.

FIG. 3 depicts a flow diagram illustrating a methodology 300 of system 100 shown in FIG. 1. An overview of methodology 300 will now be provided. UI/UX 104 of computing device 102 is capable of altering its appearance in many ways. For example, the background color of a desktop computer screen may be changed. In a more complex example, the size of fonts, font face, color and styles may be changed. In an even more complex example, UI/UX 104 may be completely "skinned" with colors, fonts, icons, sounds and interactions being reconfigured according to user taste. Accessory 140 has a color, appearance or theme, includes reconfigurable UI/UX information 144 that may be used by computing device 102 to reconfigure UI/UX 104. Reconfigurable UI/UX information 144 is selected to create UI/UX features and operations that match the color, appearance or theme of accessory 140. For example, reconfigurable UI/UX information 144, when downloaded by computing device 102, may control a connectable keyboard (not shown) of reconfigurable UI/UX 104 such that keys of the keyboard may labeled with a font lettering that matches accessory 140.

Reconfigurable UI/UX information 144 may be presented to computing device 102 in a number of ways. For example, accessory interface system 112 may physically connect with computing device interface system 150. Accessory 140 may cover or not cover a series of light-sensing apertures of sensor system 110 and/or sensor system 148 enabling computer device 102 to detect, numerically, a preconfigured color scheme. For example, attaching a yellow watch band (accessory 140) to a smart watch (computing device 102) could prompt the smart watch to detect that the band attached is yellow and download from the watchband reconfigurable UI/UX information (reconfigurable UI/UX information 144) that reconfigures the watch face/display (reconfigurable UI/UX 104) to match the color, configuration or theme of the band. As another example, a front-facing camera of reconfigurable UI/UX 104 may detect the color of accessory 140 using image recognition techniques and configure UI/UX 104 for a harmonious appearance with accessory 140. In another communication scheme, accessory 140 may provide a URL, which computing device 102 may use to access remote computer 160 to download reconfiguration UI/UX information 144 such as a GUI skin. Remote computer 160 may also update accessory 140 with the latest reconfigurable UI/UX information 144. TX/RX system 108 of computing device 102 may communicate through TX/RX system 146 of accessory 140 using Bluetooth, ANT+ or other short-range network methodologies.

Focusing now on methodology 300 shown in FIG. 3, and with selected references to system 100 shown in FIG. 1, methodology 300 begins at block 302 wherein the proximity of computing device 102 to accessory 140 is detected. In block 304, computing device 102 is notified (e.g., by accessory 140) that new UI/UX reconfiguration information 144 is available. Optionally, block 304 may include conventional notifications to a user of computing device 102 of the availability, and may also require authorization from the user to access new UI/UX reconfiguration information 144. Block 306 provides new UI/UX reconfiguration information 144 to computing device 102. In block 308, computing device 102 reconfigures its UI/UX 104 to operate according to new UI/UX reconfiguration information 144.

Thus, it can be seen from the foregoing description and illustration that one or more embodiments of the present disclosure provide technical features and benefits. Computing devices may be accessorized with multiple covers, straps, pendants and other items having a wide range of designs and colors. One or more embodiments of the present disclosure provide computing devices and accessories, wherein the accessory is provided with sufficient processor, memory and transmission functionality to store UI/UX reconfiguration information and download the UI/UX reconfiguration information to the computing device to reconfigure the UI/UX of the computing device to match the accessory.

Figure 4:
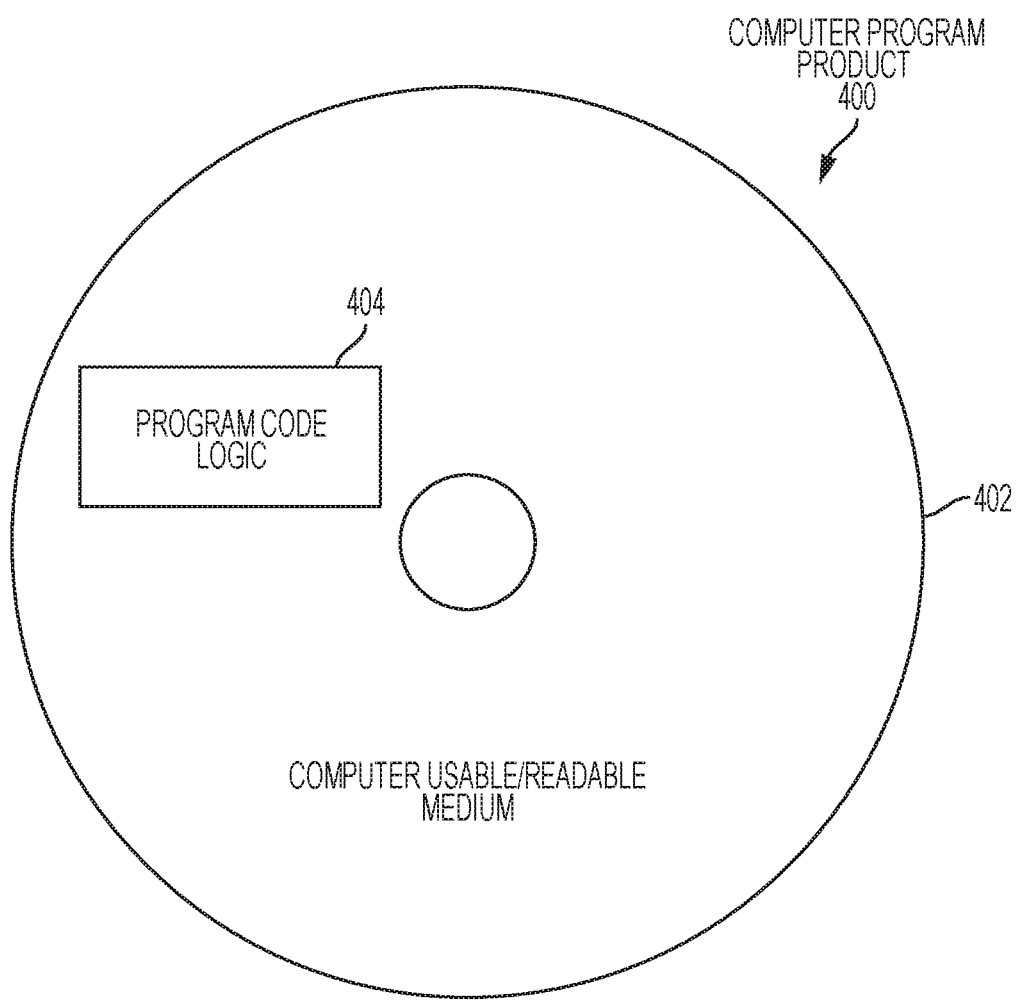
FIG. 4 depicts a computer program product in accordance with one or more embodiments.

Referring now to FIG. 4, a computer program product 400 in accordance with an embodiment that includes a computer readable storage medium 402 and program instructions 404 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A method of forming a computing device accessory, the method comprising:
   providing the computing device accessory with a sensor system a memory, a transmitter and a processor system communicatively coupled to the sensor system, the memory and the transmitter;
   storing user interface (UI) reconfiguration information in the memory, wherein the UI reconfiguration information is selected for storage based at least in part on a perceptual attribute of the computing device accessory;
configuring the sensor system to detect a predetermined proximity of the computing device accessory to a computing device comprising a reconfigurable UI; and
configuring the processor system and the transmitter to access the memory and transmit the UI reconfiguration information to the computing device comprising the reconfigurable UI;
wherein the computing device is configured to utilize the UI reconfiguration information to reconfigure the reconfigurable UI.

2. The method of claim 1, wherein:
the UI reconfiguration information further comprises user experience (UX) reconfiguration information;
the computing device further comprises a reconfigurable UX; and
the method further comprises configuring the computing device to utilize the UX reconfiguration information to reconfigure the reconfigurable UX.

3. The method of claim 1, wherein the perceptual attribute comprises a physical appearance of the computing device accessory.

4. The method of claim 1, wherein reconfiguring the reconfigurable UI comprises reconfiguring audio outputs of the reconfigurable UI.

5. The method of claim 1, wherein reconfiguring the reconfigurable UI comprises reconfiguring visual outputs of the reconfigurable UI.

6. The method of claim 1, wherein the UI reconfiguration information comprises a website address.

7. The method of claim 1, wherein the transmitter comprises:
a series of contacts configured to mate with a set of connectors of the computing device; or
a wireless transmitter.

8. A computing device accessory system comprising:
a memory having user interface (UI) reconfiguration information, wherein the UI reconfiguration information is selected and loaded into the memory based at least in part on a perceptual attribute of the computing device accessory;
a transmitter;
a sensor system; and
a processor system communicatively coupled to the sensor system, the memory and the transmitter;
wherein:
the sensor system is configured to detect a predetermined proximity of the computing device accessory to a computing device comprising a reconfigurable UI;
the processor system and the transmitter are configured to access the memory and transmit the UI reconfiguration information to the computing device comprising the reconfigurable UI; and
the computing device is configured to utilize the UI reconfiguration information to reconfigure the reconfigurable UI.

9. The system of claim 8, wherein:
the UI reconfiguration information further comprises user experience (UX) reconfiguration information;
the reconfigurable UI further comprises a reconfigurable UX; and
the computing device is further configured to utilize the UX reconfiguration information to reconfigure the reconfigurable UX.

10. The system of claim 8, wherein the perceptual attribute comprises a physical appearance of the computing device accessory.

11. The system of claim 8, wherein reconfiguring the reconfigurable UI comprises reconfiguring audio outputs of the reconfigurable UI.

12. The system of claim 8, wherein reconfiguring the reconfigurable UI comprises reconfiguring visual outputs of the reconfigurable UI.

13. The system of claim 8, wherein the UI reconfiguration information comprises a website address.

14. The system of claim 8, wherein the transmitter comprises:
a series of contacts configured to mate with a set of connectors of the computing device; or
a wireless transmitter.

15. A computer program product for reconfiguring a computing device, the computer program product comprising:
a computer readable storage medium having program instructions embodied therewith, wherein the computer readable storage medium is not a transitory signal per se, the program instructions readable by at least one processor system to cause the at least one processor system to perform a method comprising:
receiving, from an image detector, image data derived from a captured image of a computing device accessory;
accessing a memory of the computing device accessory, wherein the memory includes user interface (UI) reconfiguration information, and wherein the UI reconfiguration information is selected and loaded into the memory based at least in part on a perceptual attribute of the computing device accessory derived from the image data; and
transmitting, using a transmitter of the computing device accessory, the UI reconfiguration information to a computing device, wherein the computing device comprises a reconfigurable UI, and wherein the computing device is configured to utilize the UI reconfiguration information to reconfigure the reconfigurable UI.

16. The computer program product of claim 15, wherein:
the UI reconfiguration information further comprises user experience (UX) reconfiguration information;
the reconfigurable UI further comprises a reconfigurable UX; and
the computing device is further configured to utilize the UX reconfiguration information to reconfigure the reconfigurable UX.

17. The computer program product of claim 15, wherein the perceptual attribute comprises a physical appearance of the computing device accessory.

18. The computer program product of claim 15, wherein reconfiguring the reconfigurable UI comprises:
reconfiguring audio outputs of the reconfigurable UI; or
reconfiguring visual outputs of the reconfigurable UI.

19. The computer program product of claim 15, wherein the transmitter comprises a wireless transmitter.

20. The computer program product of claim 15, wherein the transmitter comprises:
a series of contacts configured to mate with a set of connectors of the computing device; or
a wireless transmitter.

* * * * *